United States Patent [19]

Tannehill

[11] Patent Number: 5,005,627
[45] Date of Patent: Apr. 9, 1991

[54] DEVICE FOR SEALING BETWEEN A TUBELESS TIRE AND A RIM DURING TIRE INFLATION PROCESS

[75] Inventor: J. C. Tannehill, Baton Rouge, La.

[73] Assignee: Quick & Easy Tire Products, Inc., Mandeville, La.

[21] Appl. No.: 889,306

[22] Filed: Jul. 28, 1986

Related U.S. Application Data

[63] Continuation-in-part of Ser. No. 659,949, Oct. 11, 1984, abandoned.

[51] Int. Cl.$^5$ .................. B60C 25/00; B60C 25/05; B27H 7/00
[52] U.S. Cl. .................. 157/001.1; 157/1.17
[58] Field of Search ............ 152/330 R, 415, DIG. 9; 157/1.1, 1, 1.17; 29/455.1

[56] References Cited

U.S. PATENT DOCUMENTS

| | | | |
|---|---|---|---|
| 2,779,397 | 1/1957 | Kohsiek | 157/1.1 |
| 2,792,057 | 5/1957 | Schreiner | 157/1.1 |
| 2,874,761 | 2/1959 | Varvaro | 157/1.1 |
| 2,954,079 | 9/1960 | Tarner | 157/1.1 |
| 3,280,880 | 10/1966 | Ericson et al. | 157/1.1 |

Primary Examiner—Michael W. Ball
Assistant Examiner—Gregory J. Wilber
Attorney, Agent, or Firm—Thomas S. Keaty

[57] ABSTRACT

An improved tubeless tire inflation device, for sealing between a tubeless tire and a rim during the tire inflation process, is provided, comprising a sleeve having an inside diameter not greater than the largest outside diameter of the tire rim, the sleeve having an axial length such that the sleeve may sealingly span between the rim and the tire. The sleeve is composed of a resilient material, such as belted rubber, which is deformable, yet retains sufficient strength and shape to provide the desired seal between rim and tire. The sleeve is further provided with a layer of compressible material around its entire circumference on at least one end.

4 Claims, 3 Drawing Sheets

DEVICE FOR SEALING BETWEEN A TUBELESS TIRE AND A RIM DURING TIRE INFLATION PROCESS

This application is a continuation-in-part of application Ser. No. 659,949, filed 10/11/84 now abandoned.

BACKGROUND OF THE INVENTION

1. Field of the Invention

This invention relates broadly to devices which aid in the inflation of tubeless tires, and, more particularly, to such devices which provide a temporary seal between tire and rim as the tire is being inflated.

2. Prior Art

Many devices have been designed in order to aid in the inflation of tubeless tires. In its deflated state, a tubeless tire does not completely seal against its rim. Some sort of aid is necessary to temporarily seal the tire as air is added. Examples of such devices may be found in the following patents:

| U.S. Pat. No. | Inventor | Title |
|---|---|---|
| 1,966,580 | Arthur W. Bull | Method for Mounting Tires |
| 2,684,112 | Gilbert E. Coates | Flexible Tire Compressing Device |
| 2,874,761 | A. J. Varvaro | Bead Seating and Inflating Device For Tubeless Tires |
| 2,786,516 | A. A. Schreiner | Bifurcated Bead Seating Device For Tubeless Tires |
| 2,792,057 | A. A. Schreiner | Device For Mounting Tubeless Tires |
| 2,797,744 | F. W. Smith | Tire Bead Seating Device |
| 2,810,432 | A. A. Schreiner | Bead Seating Device For Tubeless Tires |
| 2,849,059 | G. P. Bosomworth | Bead Seating and Inflating Device For Tubeless Tire |
| 2,874,759 | E. G. Ranallo | Bead Seating and Inflating Device For Tubeless Tires |
| 2,910,117 | U. D. Lamerson | Method and Apparatus For Inflating a Tubeless Tire and Seating The Beads |
| 2,913,035 | Z. L. Lapin, et al. | Mounting Device For Tubeless Tires |
| 2,918,115 | H. G. Twiford | Bead Seating and Inflating Device For Tubeless Tires |
| 2,936,827 | M. B. Riggs | Apparatus For Mounting and Inflating Tubeless Tires |
| 2,765,841 | J. E. Lydle | Apparatus For Seating The Beads of Tubeless Tires by Peripheral Pressure |
| 2,874,760 | W. F. Bishop | Bead Seating Device For Tubeless Tires |
| 3,528,474 | G. May | Tubeless Tire Inflator |
| 3,552,469 | Lee M. Corless | Tire Bead Seater |
| 3,973,615 | Joseph J. Cunha | Apparatus For Seating The Beads On Tubeless Tires |
| 3,978,903 | John L. Mueller, et al. | Tubeless Tire Bead Seater |

As can be seen, various attempts have been made to solve the problem. A need remains for a device which performs the desired task, but which is also portable. Many of the above listed devices require complicated and relatively massive equipment. Such equipment is not readily adaptable to portable use and is also expensive. In a typical service station or tire establishment, the requirements of portability and minimal expense are essential. An even more important requirement is durability. Large scale equipment with many parts is subject to breakage and down time. Also, employee misuse is a very real problem. Equipment is sometimes abused by employees. Small pieces of equipment are even subject to being crushed by vehicles.

Because of the above requirements, prior attempts at providing a commercially successful tubeless tire inflation device have been largely unsuccessful. The most commonly used method of inflation involves the use of ether or other explosive gases. The ether is sprayed into the deflated tire mounted on its rim. A flame is introduced to the area (usually by a lighted match tossed near the tire). The resulting explosion causes rapid expansion of the gases inside the tire and the tire temporarily seals against the rim. Air is then quickly added to the tire. This method has resulted in severe burns and eye injuries. However, this method is extremely popular due to minimal equipment requirements and portability.

The invention described in the Varvaro patent, listed above, solves some of the above described problems. The Varvaro device is compact, inexpensive and safe to use. This device, however, has never proven to be commercially popular. It is believed that the lack of popularity results at least partially from the fact that the Varvaro device is easily deformed and thus may not provide an adequate seal. The most preferred embodiment of the Varvaro device is a metal ring coated with a compressible material. If the Varvaro device is crushed or bent, it will not provide the necessary seal. Also, the rigid nature of the device does not allow for ease of storage.

SUMMARY OF THE INVENTION

Considering the above, it is an object of this invention to provide an improved tubeless tire inflation device which is portable, inexpensive, and durable.

It is another object of this invention to provide such a device which can be deformed, yet remain useful for the intended purpose.

It is still another object of this invention to provide such a device which has a redundant sealing feature.

Still further objects and advantages of this invention shall become apparent from the ensuing descriptions of the invention.

Accordingly, an improved tubeless tire inflation device for sealing between a tubeless tire and a rim during the tire inflation process is provided comprising a sleeve having an inside diameter not greater than the largest outside diameter of the tire rim, the sleeve having an axial length such that the sleeve may sealingly span between the rim and the tire. The sleeve is composed of a resilient material, such as belted rubber, which is deformable, yet retains sufficient strength and shape to provide the desired seal between rim and tire. The sleeve is further provided with a layer of compressible material around its entire circumference on at least one end. A layer of compressible material may be provided at both ends of the sleeve.

Another embodiment of the present invention provides for a sleeve having a groove along the entire circumference of at least one of its ends. The groove is adapted to house a sealing insert in secured relationship thereto. The sealing insert is preferably made of a softer material than the sleeve to increase its sealing capabilities. Another groove may be made in the second axial end of the sleeve to similarly house the sealing insert. The sealing insert is designed to contact the tubeless tire while the vertical wall of the cylindrical sleeve contacts the rim by its interior surface.

DESCRIPTION OF PREFERRED EMBODIMENTS OF THE INVENTION

Figure 1:
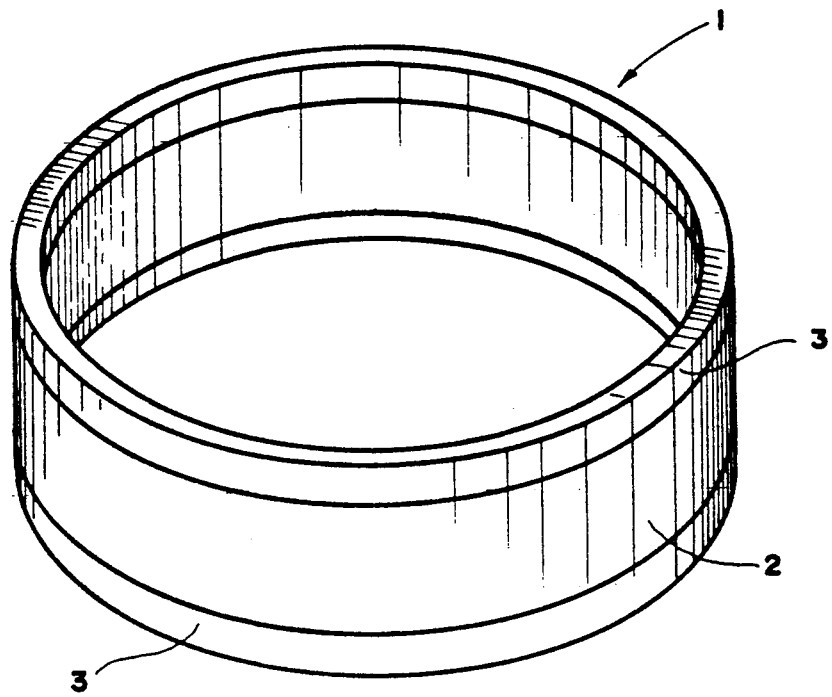
FIG. 1 is a three-dimensional view of a preferred embodiment of the invention.
Figure 2:
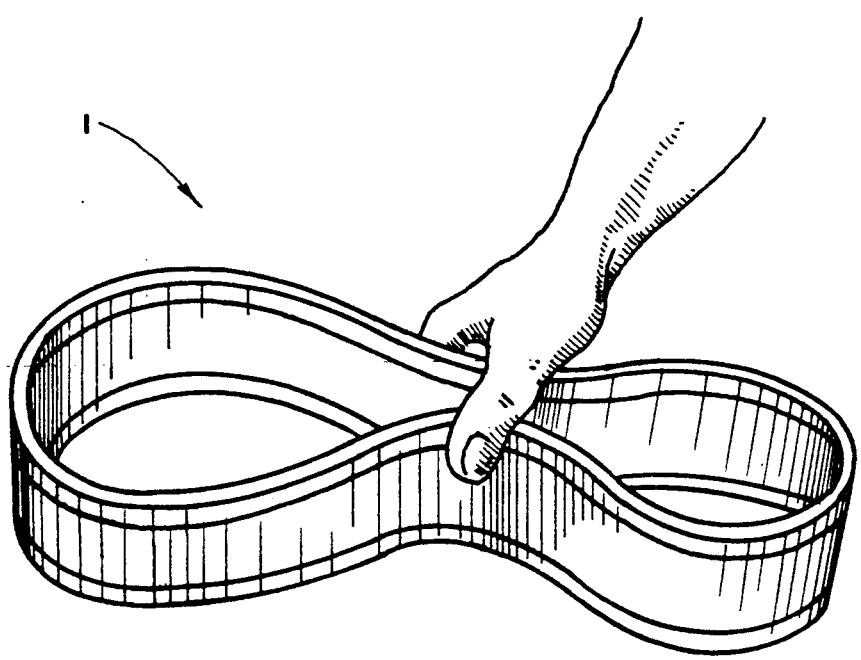
FIG. 2 is another three-dimensional view of a preferred embodiment of the invention, illustrating the flexibility of the invention.
Figure 3:
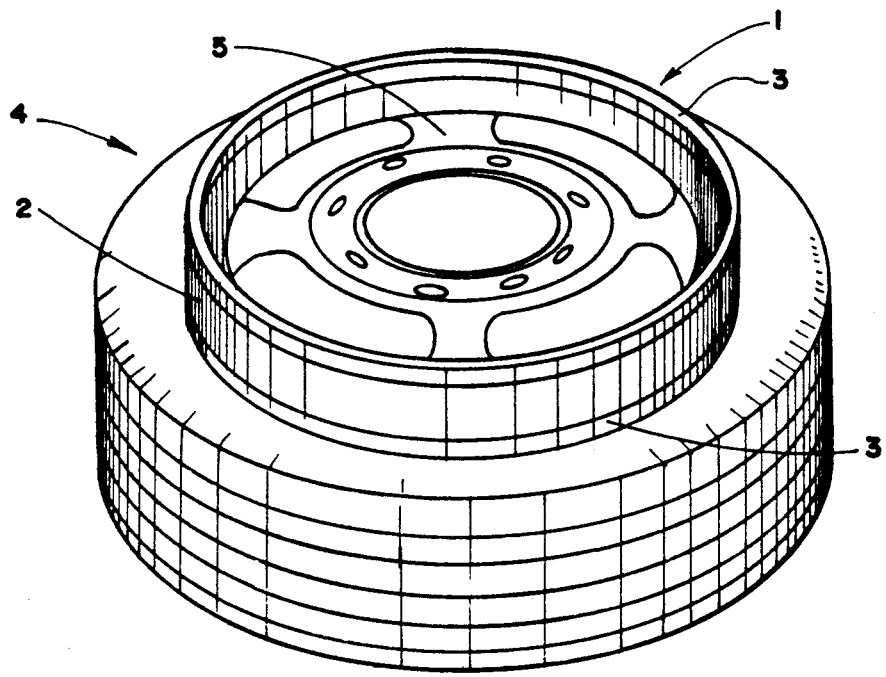
FIG. 3 is a three-dimensional view of a preferred embodiment of the invention in place between a tubeless tire and a rim.
Figure 4:
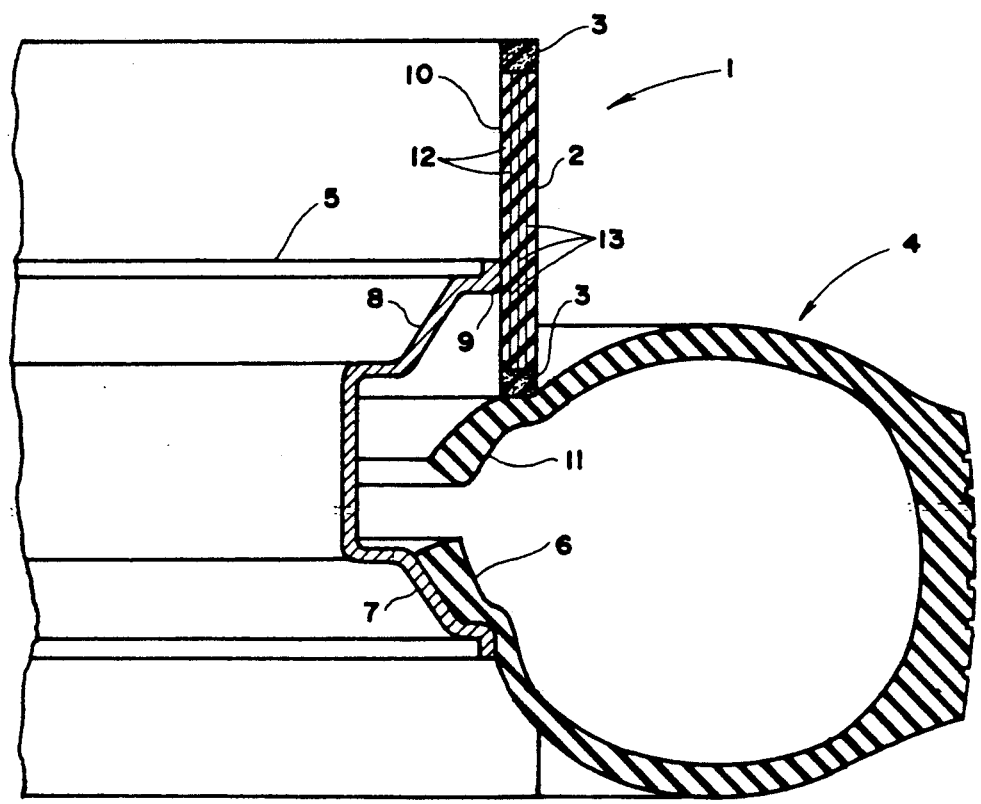
FIG. 4 is a partial sectional view of a preferred embodiment of the invention in place between a tubeless tire and a rim.

The inflation device 1 is depicted in FIG. 1. The device comprises a cylindrical sleeve 2 and at least one layer of compressible material 3 around the circumference of either end of the sleeve 2. As shown in FIGS. 2 and 3, the device 1 is placed between a deflated tubeless tire 4 and a rim 5.

As shown in FIG. 3, in order to inflate tire 4, the lower bead 6 of the tire 4 is brought into contact with the lower portion 7 of rim 5. The inflation device 1 is placed around the upper portion 8 of rim 5. The inside diameter of the device 1 should not be greater than the diameter of the rim flange 9. The compressible material 3 (such as sponge rubber) is brought into contact with the tire 4. Thus, a seal is provided between the rim flange 9 and the tire 4. As the tire 4 is inflated, the inside surface 10 of sleeve 2 sealingly slides along rim flange 9 until the upper bead 11 of tire 4 seats itself in the upper portion 8 of the rim 5. The device 1 may then be easily lifted off of the rim 5. In order to provide the desired sealing effect and durability, it is preferred that the sleeve 2 be constructed of a flexible material, such as flexible rubber 12. Thus, as shown in FIG. 2, the device 1 may be folded for storage and is also durable. Of course, it is necessary that the sleeve 2, while being deformable, have the strength to provide the desired seal. It has been found that, by providing circumferential belts 13 of strengthening material (such as various types of cord or steel mesh) between layers of rubber 12, the desired strength may be obtained.

By providing a layer of compressible material 3 at each axial end of sleeve 2, the user may reverse the position of the sleeve 2 should one end become worn or damaged. Also, a time savings results when the user is not required to determine which end of the device 1 to insert over the rim 5.

Figure 5:
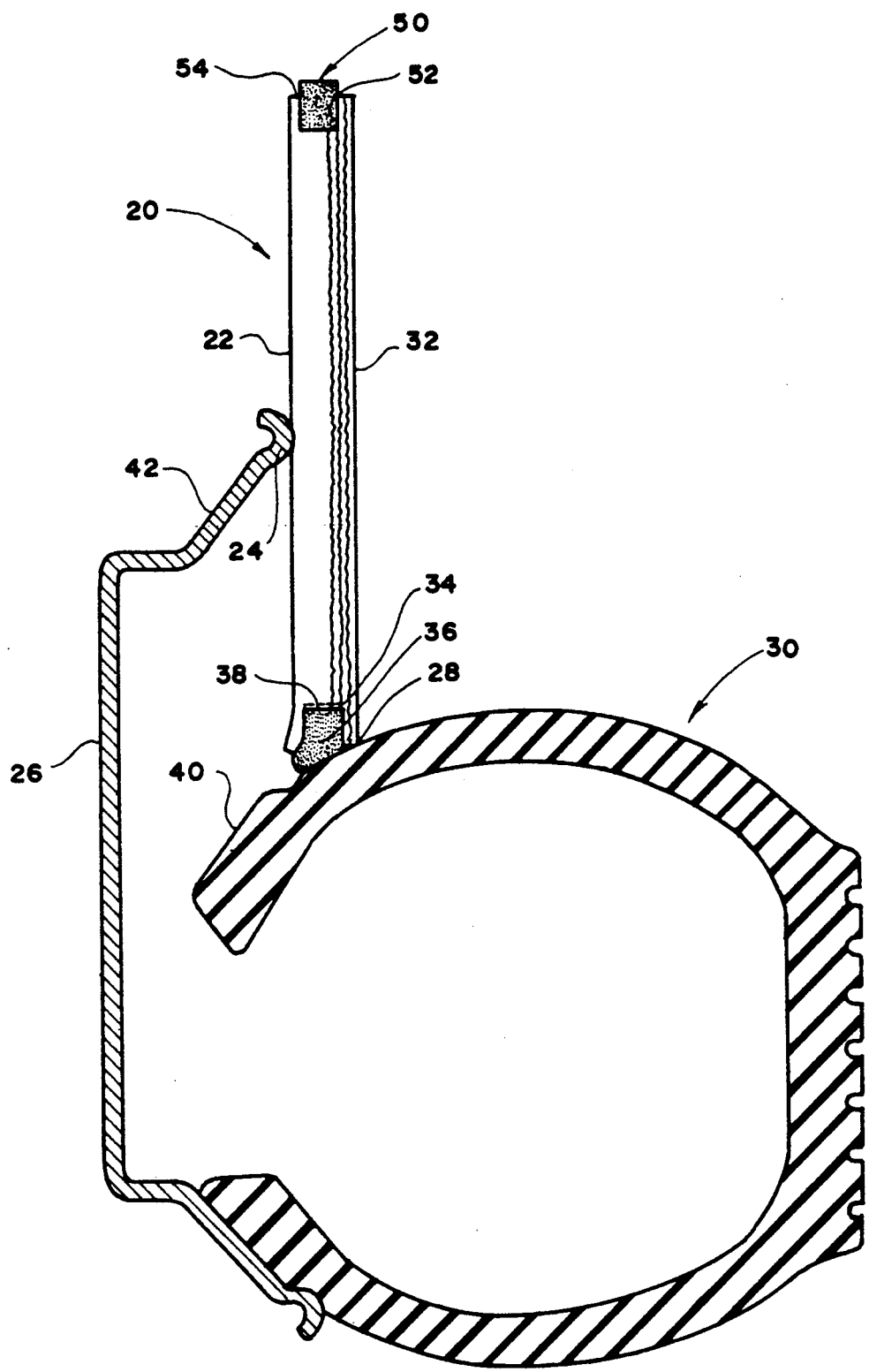
FIG. 5 is a cross-sectional view of another preferred embodiment of the invention.

FIG. 5 illustrates another embodiment of the present invention, wherein numeral 20 designates the inflation device or sleeve having its inner surface 22 contact a curved tip 24 of a rim 26, while one end 28 of the inflation device seats against a wall of the deflated tire 30.

The cylindrical sleeve 20 is preferably made of a flexible material, such as rubber, similar to the material utilized for manufacture of tires. An outer wall 32 of the sleeve 20 has at least one, but maybe more layers of reinforcement material, such as durable nylon, vulcanized into the body of the sleeve. These layers assure and maintain the selected size for each rim 30 and also prevent stretching while allowing the sleeve 20 to retain its flexibility.

The inner wall 22 of the sleeve 20 is slightly compressed at the point of its contact with the curved part 24 of the rim 26, the advantages of this design will be explained in more detail hereinafter.

A groove 34 is formed at the end 28 of the sleeve 20 extending along its entire circumference. A sealing insert 36 is fitted into the groove 34 and is secured therein by for example, gluing it into the groove along bottom 38 of the groove 34.

The insert 36 is then allowed to expand and fill in the groove 34. While being compressed, the insert 36 will slightly push outside the side walls of the groove 34, as can be seen in FIG. 5.

The sealing insert 36 is preferably made of a softer, more compressible material than the sleeve 20. Such material can be, for example, premium grade neoprene rubber.

As can be seen in FIG. 5, the end 28 of the sleeve 20 and the sealing insert are compressed along the line of their contact with the tire 30 and their lateral dimensions slightly increase along this line. This feature becomes important when the tire 30 is being inflated and comes to a critical point or either continue the inflation or drop the pressure. This slightly increased area insures that no drop of pressure takes place and the inflation of the tire is finalized.

During the inflation process, the seal is formed between the rim 26, at its line of contact with the sleeve 20, and tire 30 along its line of contact with the end 28 of the sleeve 20. To further insure the seal between the sleeve and the rim, the outer diameter of the sleeve 20 is made slightly smaller than the diameter of the rim lip. Therefore, in case if the rim has any deformation, still the necessary seal can be achieved. This design also provides resistance to the tire 30 when it is inflated until such time when the bead 40 of the tire 30 seats against tapered seat area 42 of the rim 26.

Another advantage which is derived from the use of the present embodiment is that no "pinching" of the sleeve occurs between the tire bead 40 and the rim 26, which is often the problem with the prior devices known to the applicant. When "pinching" occurs, the tire had to be deflated and inflation initiated again.

A matching sealing insert 50 may be inserted into a corresponding groove 52 formed at another axial end 54 of the sleeve 20 so that either end of the sleeve can be placed on the tire 30 to assist in the inflation of the tire.

Thus, a tubeless tire inflation device is provided which is efficient, inexpensive, durable, safe and easy to use. No harmful gases are required. The device may even be folded and stored under an automobile or truck seat. There are, of course, many alternate embodiments not specifically described, but which are intended to be included within the scope of this invention as defined by the following claims.

I claim:

1. An improved tubeless tire inflation device for sealing between a tubeless tire and a rim during the tire inflation process, comprising a cylindrical, flexible sleeve having an inside diameter not greater than the largest outside diameter of said rim, said sleeve having an axial length such that said sleeve may sealingly span between said rim and said tire, at least one axial end of said sleeve having a groove along the entire circumference of said sleeve, said groove housing a sealing insert therein, the sealing insert being formed of a softer, more compressible composition than the sleeve, said sealing insert being securely attached within the groove along the bottom of the groove and extending circumferentially around the groove, said insert having a portion which protrudes outside the groove and beyond the axial end of the sleeve, such that the protruding portion sealingly contacts the tire.

2. An improved tubeless tire inflation device for sealing between a tubeless tire and a rim during the tire inflation process, comprising a cylindrical, flexible sleeve having an inside diameter not greater than the largest outside diameter of said rim, said sleeve having an axial length such that said sleeve may sealingly span between said rim and said tire, axial ends of said sleeve each having a groove along the entire circumference of said sleeve on both ends of said sleeve, said groove housing a sealing insert therein, the sealing insert being formed of a softer, more compressible composition than the sleeve, said insert having a portion which protrudes outside the groove and beyond the axial ends of the sleeve, such that the protruding portion of the insert sealingly contacts the tire, said insert extending circumferentially around the groove.

3. The device as described in claim 1, wherein said sleeve is reinforced by at least one circumferential layer of flexible strengthening material.

4. The device of claim 3, wherein said layer of flexible strengthening material reinforces said sleeve adjacent a radially outer circumference of the sleeve.

* * * * *

UNITED STATES PATENT AND TRADEMARK OFFICE
CERTIFICATE OF CORRECTION

PATENT NO. : 5,005,627

DATED : April 9, 1991

INVENTOR(S) : J. C. Tannehill

It is certified that error appears in the above-identified patent and that said Letters Patent is hereby corrected as shown below:

On the title page, item [54] and in column 1, lines 1-3, the title should read as follows:

--DEVICE FOR SEALING BETWEEN A TUBELESS TIRE AND A RIM DURING TIRE INFLATION PROCESS--.

Signed and Sealed this

Eleventh Day of August, 1992

Attest:

DOUGLAS B. COMER

*Attesting Officer*  *Acting Commissioner of Patents and Trademarks*